UNITED STATES PATENT OFFICE.

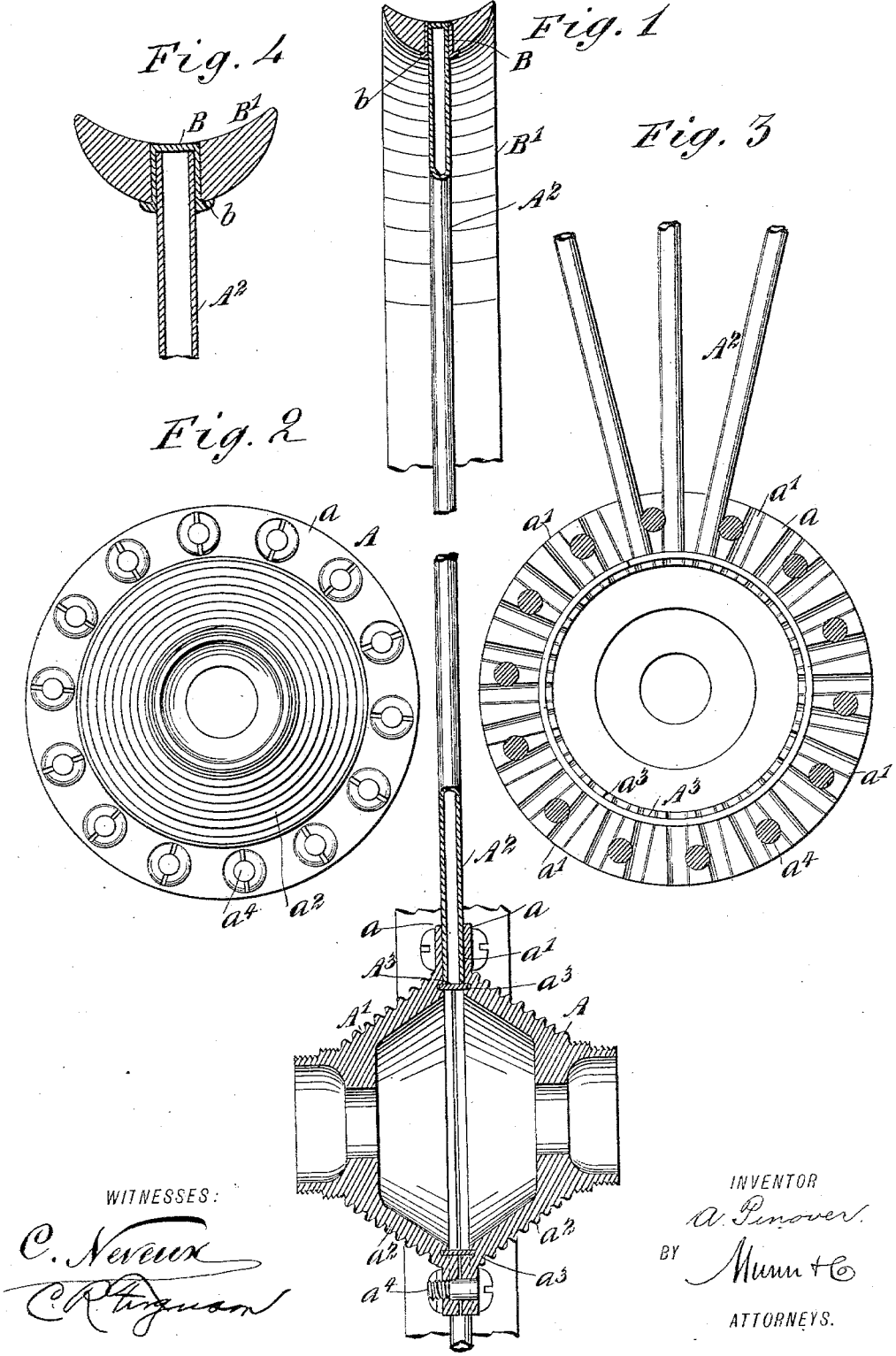

ALEXANDER PINOVER, OF NEW YORK, N. Y.

VEHICLE-WHEEL.

SPECIFICATION forming part of Letters Patent No. 566,618, dated August 25, 1896.

Application filed November 16, 1895. Serial No. 569,175. (No model.)

*To all whom it may concern:*

Be it known that I, ALEXANDER PINOVER, of New York, in the county and State of New York, have invented certain new and useful Improvements in Vehicle-Wheels, of which the following is a full, clear, and exact description.

This invention relates to vehicle-wheels particularly adapted for bicycles, tricycles, and the like, and the object is to provide a wheel that will embody great strength with lightness, and, further, to provide a wheel so constructed that new spokes may be easily and quickly inserted to replace broken or bent ones.

The invention consists in the construction and novel arrangement of parts, as will hereinafter appear, and be particularly pointed out in the appended claims.

Reference is to be had to the accompanying drawings, forming a part of this specification, in which similar characters of reference indicate corresponding parts in all the figures.

Figure 1 is a sectional elevation of a wheel embodying my invention. Fig. 2 is an end view of the hub. Fig. 3 is an interior view of a section of the hub, and Fig. 4 is a sectional view showing the manner of attaching a spoke to the rim.

In carrying out my invention I form a hub of two sections A A', each substantially in the form of a hollow truncated cone, the inner and outer wall surfaces being substantially parallel or having the same inclination, and the bases of which are secured together. For the sake of lightness I may form the hub-sections of aluminium or an alloy containing aluminium; but it is to be understood that I may form the hub of other metal without departing from the spirit of my invention.

The base portion of each section is provided with an annular flange $a$, and the inner surfaces of these flanges are provided with radial grooves $a'$, the grooves of one flange being coincident with the grooves of the other, so that when the two sections are secured together sockets are formed for the ends of the spokes $A^2$.

For the purpose of giving strength to the conical sections of the hub I prefer to provide them on the outer side with a series of annular ribs $a^2$, arranged closely together.

An abutment is provided for the inner ends of the spokes, which not only serves to receive the longitudinal pressure of the spokes, but also serves as a gage and retainer for the spokes while inserting them. This abutment consists of a flat metal ring $A^3$, removably seated in annular channels $a^3$, formed in the flanges $a$, or in the meeting surfaces of the hub-sections. This ring may be of harder metal than the hub, such, for instance, as spring-brass, and it is shown as open at the ends, so that it may be sprung into place.

After the spokes are inserted in one section of the hub the other section is to be placed in position and fastening-screws $a^4$ passed through the holes in the flanges $a$. The screws are shown as of sufficient diameter to extend their sides slightly into the sockets formed by the grooves $a'$ to engage in notches formed in the spokes and thus secure the spokes from longitudinal displacement.

The metal spokes $A^2$ are preferably tubular, so as to gain a maximum amount of strength with a minimum amount of weight. The outer ends of the spokes are seated in metal sockets B, placed in holes formed in the wooden rim B'. These sockets are in the form of thimbles closed at their outer end and having flanges $b$ at their inner end to engage against the inner surface of the rim.

It is obvious that a wheel constructed as above described will have great strength and that a new spoke or set of spokes may be easily inserted by the owner of the wheel, thus rendering it unnecessary to take the bicycle to a skilled repairer. Of course a purchaser of a bicycle embodying this improvement may at the same time, or as desired, purchase extra spokes for the purpose of repairs.

Having thus described my invention, I claim and desire to secure by Letters Patent—

1. A hub for a vehicle-wheel, consisting of two sections, each substantially in the form of a hollow truncated cone and each having socket portions formed in its base, bolts for securing the bases together, spokes seated in the sockets two adjacent spokes being engaged by one securing-bolt, and an abutment-ring removably seated in an annular channel formed in the base of one of the sections, substantially as specified.

2. A hub for a vehicle-wheel, comprising two metal sections in the form of hollow truncated cones with the bases in engagement, and having the outer surfaces provided with annular corrugations arranged closely together, base-flanges on the sections having spoke-socket portions and an abutment-ring removably seated in the base portions, substantially as specified.

3. A wheel-hub, comprising two conical shells arranged base to base, outwardly-projecting annular flanges on the bases and provided with radial socket-forming grooves, and a resilient metal abutment-ring open at the ends and removably seated in channels formed in the base portions, substantially as specified.

4. A vehicle-wheel hub, comprising two conical shell portions, the outer and inner wall surfaces being substantially of the same inclination, the annular flanges on the meeting base portions and having socket-forming grooves, a removable ring seated in channels formed in the base portions and serving as an abutment and gage for the spokes, the spokes, and fastening devices consisting of bolts passing through holes in the flanges and engaging in notches in the spokes, substantially as specified.

ALEXANDER PINOVER.

Witnesses:
 A. A. HOPKINS,
 C. R. FERGUSON.